United States Patent [19]

Akiyama

[11] Patent Number: 4,721,414

[45] Date of Patent: Jan. 26, 1988

[54] MARINE FENDERS

[75] Inventor: Hitoshi Akiyama, Zushi, Japan

[73] Assignee: Bridgestone Corporation, Tokyo, Japan

[21] Appl. No.: 837,633

[22] Filed: Mar. 10, 1986

[30] Foreign Application Priority Data

Mar. 9, 1985 [JP] Japan .................................. 60-46729

[51] Int. Cl.$^4$ .............................................. E02B 3/22
[52] U.S. Cl. .................................... 405/212; 114/219; 267/140
[58] Field of Search ............... 405/211, 212, 213, 214, 405/215; 114/219, 220; 267/115, 136, 139, 140

[56] References Cited

U.S. PATENT DOCUMENTS

| 3,708,988 | 1/1973 | Miura ................................. 405/215 |
| 3,798,916 | 3/1974 | Schwemmer ....................... 405/215 |
| 3,828,715 | 8/1974 | Matsushita ..................... 405/212 X |
| 3,948,500 | 4/1976 | Korbuly et al. ................. 405/215 X |
| 4,267,792 | 5/1981 | Kimura et al. .................. 405/215 X |

FOREIGN PATENT DOCUMENTS 940684 10/1963 United Kingdom .
1219310 1/1971 United Kingdom .
2037397 7/1980 United Kingdom .

Primary Examiner—Dennis L. Taylor
Attorney, Agent, or Firm—Sughrue, Mion, Zinn, Macpeak, and Seas

[57] ABSTRACT

A marine fender used for mitigating a berthing shock of a vessel is disclosed, which is mounted to a berthing wall and made from an elastomeric material. This marine fender comprises a main cylindrical portion having a fitting flange, and a closed head portion formed by outwardly extending the front end of the main cylindrical portion.

3 Claims, 8 Drawing Figures

FIG._2

MARINE FENDERS

BACKGROUND OF THE INVENTION

1. Field of the Invention

This invention relates to a marine fender mounted to a berthing wall such as quay wall or the like for mitigating a berthing shock of a vessel.

2. Related Art Statement

It is well-known that marine fenders having various forms such as cylindrical form, hollow frustoconical form, hollow frustopyramidal form and the like are made from an elastomeric material such as rubber, rubbery resin or the like and are used by mounting to the berthing wall. In general, a shock receiving plate made of steel is attached to the top of the marine fender for making a force per unit area acting to the outside plate of the vessel small and uniform.

However, when adopting the shock receiving steel plate, it is required to hang such a shock receiving plate having a large weight through chains or the like attached at one end to the quay wall. Further, the marine fender can not follow the change in the form of the vessel body because of the large rigidity of the shock receiving plate.

For the most part of marine fenders provided with the shock receiving plate, the deformation amount with respect to initial loading is small, so that the oscillation of the mooring vessel becomes unfavorably large. In order to solve this problem, a round flexible marine fender may further be disposed to the front surface of the shock receiving plate, which results in the increase of installation cost for marine fender.

SUMMARY OF THE INVENTION

It is, therefore, an object of the invention to provide a marine fender having an ideal loadcompressive deformation characteristic without using a shock receiving plate.

This object and others of the invention are achieved when a marine fender made of an elastomeric material is constituted with a main cylindrical portion having a fitting flange in its base end, and a closed head portion formed by outwardly extending the front end of the main cylindrical portion.

According to the above construction, the closed head portion easily deforms at initial loading and subsequently the main cylindrical portion deforms with the increase of the loading, and consequently a large reaction force is produced in accordance with the degree of the deformation.

BRIEF DESCRIPTION OF THE DRAWINGS

The invention will be described with reference to the accompanying drawings, wherein.

DESCRIPTION OF THE PREFERRED EMBODIMENTS

The invention will be described in detail with reference to a first embodiment of the marine fender shown in FIGS. 1 to 6.

Figure 1:
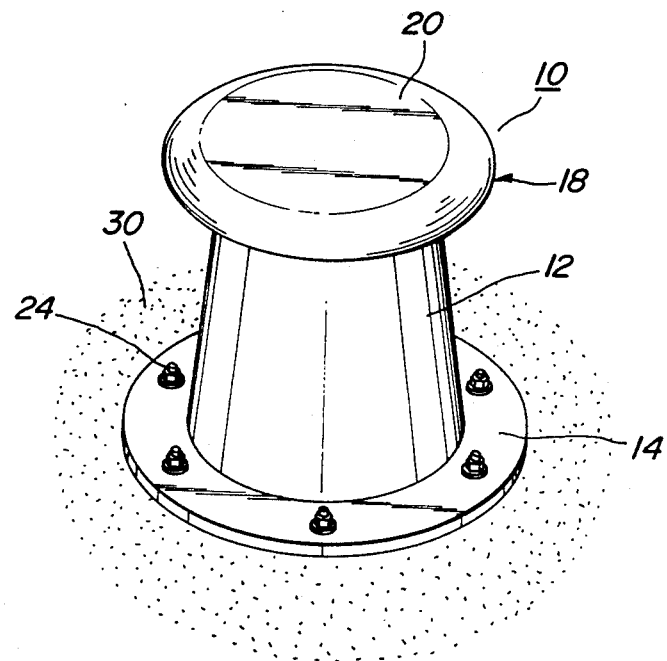
FIG. 1 is a perspective view of an embodiment of the marine fender according to the invention.
Figure 2:
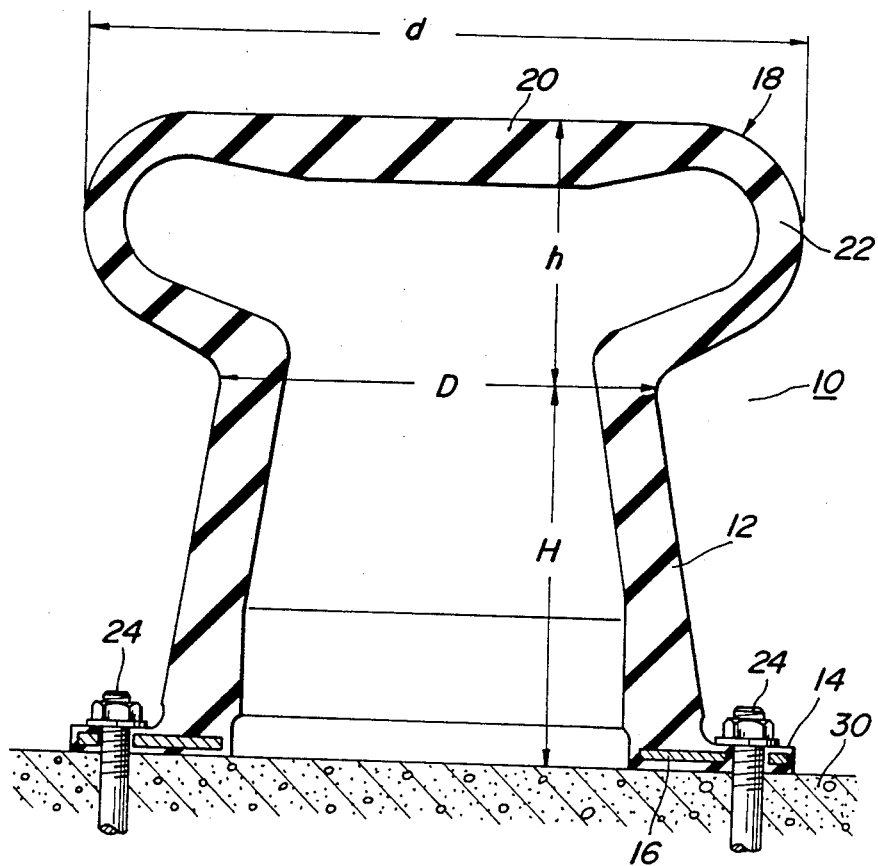
FIG. 2 is a longitudinal sectional view taken in the center of FIG. 1.

FIGS. 1 and 2 are perspective and longitudinal sectional views of a rubber marine fender 10, respectively. The marine fender 10 is a hollow body having an opened base end and a closed front end, which is constituted with a main cylindrical portion 12 having a fitting flange 14 in its base end, and a closed head portion 18 having a diameter larger than that of the small size part (front end) of the main cylindrical portion 12 and formed by outwardly extending the front end of the main cylindrical portion 12. In the closed head portion 18, the thickness of the flat part 20 is made larger than that of the curved part 22. The illustrated marine fender 10 is fixed at its flange 14, which is reinforced with a rigid steel member 16, to a berthing wall 30 through plural anchor bolts 24.

When the height of the main cylindrical portion 12 is H, the outer diameter of the small size part thereof is D, and the height and outer diameter of the closed head portion 18 are h and d, respectively, the deformation amount at initial loading increases as h becomes higher, while the force per unit area during berthing is lowered as d becomes larger, so that the characteristics of the marine fender can optionally be selected by determining these size values. Particularly, the form of the marine fender is preferable to satisfy the relations of $\frac{1}{4} \leq h/H \leq 1$ and $1 < d/D \leq 3$.

Figure 3:
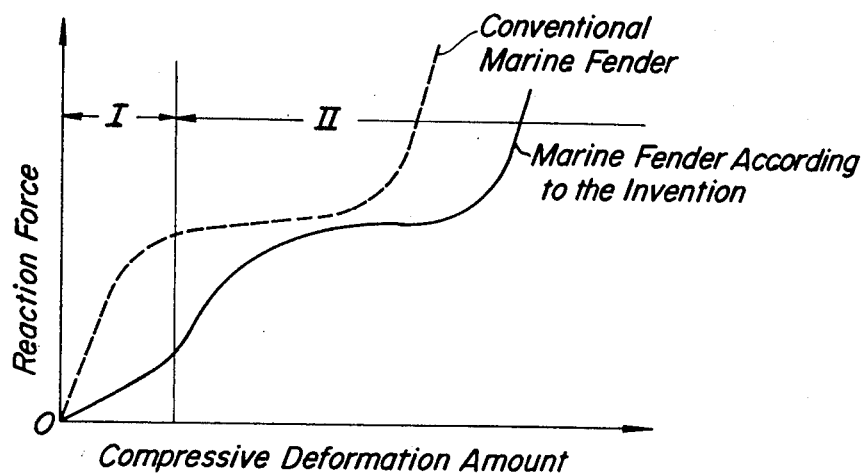
FIG. 3 is a graph showing reaction forcecompressive deformation amount characteristics of the marine fender according to the invention and the conventional marine fender provided with the shock receiving plate.

The marine fender 10 having the above mentioned form has characteristics as shown by a solid line in FIG. 3 (which shows a relation between compressive deformation amount and reaction force). As compared with the characteristic curve of the conventional marine fender provided with the shock receiving plate, which is shown by a broken line in FIG. 3, it can be seen from FIG. 3 that in the marine fender 10 the initial deformation is easily performd and a larger deformation is produced with the increase of the loading.

Figure 5:
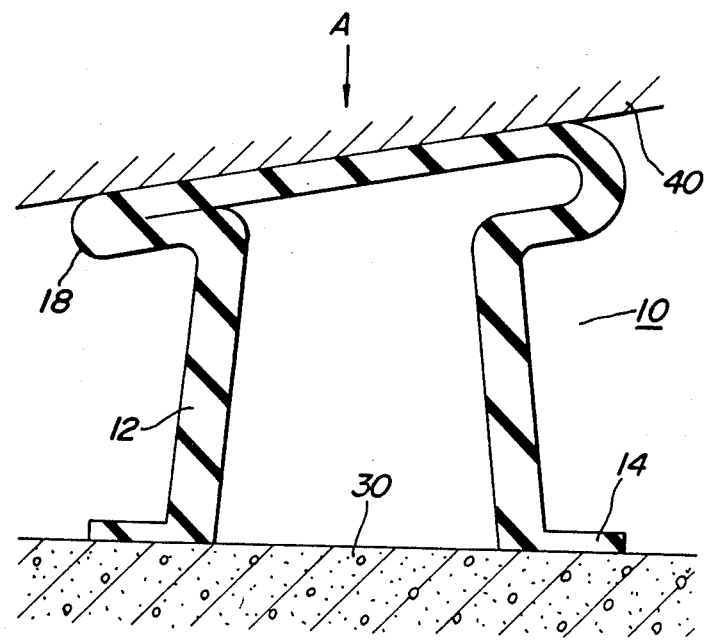
Figure 6:
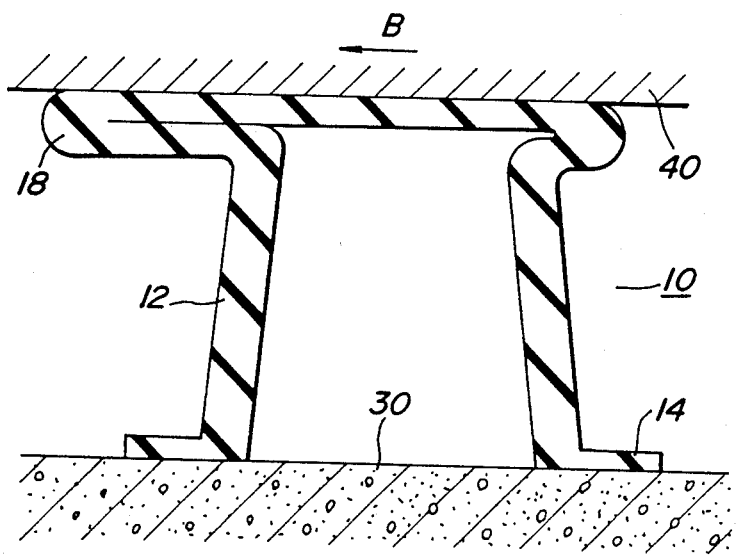

The deformation behavior of the marine fender 10 in the berthing will be described with respect to FIGS. 4 to 6 below.

Figure 4:
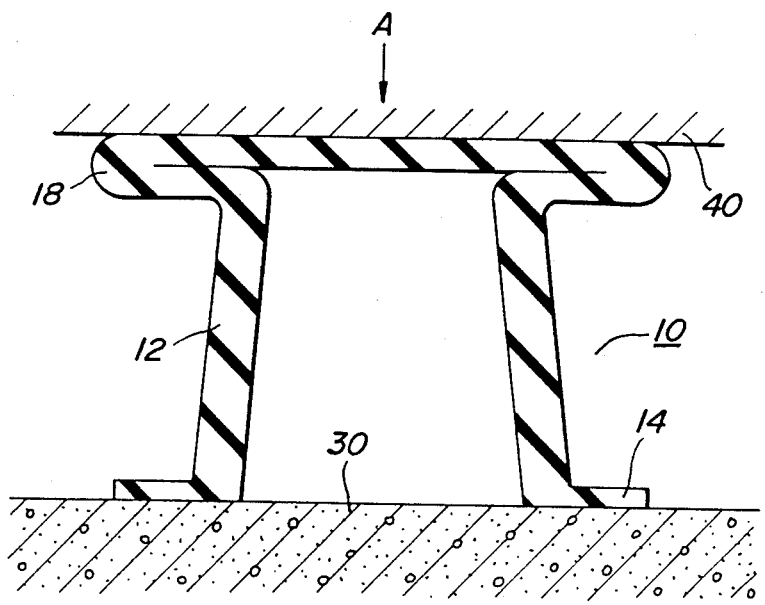
FIGS. 4 to 6 are schematic views illustrating various deformation behavior of the marine fender of FIG. 1, respectively.

In FIG. 4 is shown a compression deformed state of the closed head portion 18 when an outside plate 40 of a vessel is berthed in parallel to the flat top part 20 and in a direction of an arrow A. FIG. 5 illustrates the compression deformed state of the closed head portion 18 when the outside plate 40 is berthed at a certain angle inclined with respect to the flat top plate 20 and in a direction of an arrow A. FIG. 6 illustrates the compression deformed state of the closed head portion 18 when the outside plate 40 is berthed in parallel with the flat top part 20 and in a direction of an arrow B (parallel with the berthing wall 30). All of these deformed states are at the beginning of the berthing and correspond to a range I of FIG. 3. In any case, the closed head portion 18 as a shock receiving member is flexible, so that the deformation thereof easily follows to the inclination berthing in FIG. 5, the shearing berthing in FIG. 6 or other different vessel forms, during which an influence of compression deformation on the base of the main cylindrical portion 12 is small, so that the service durability of the marine fender 10 is good.

As the outside plate 40 further moves toward the berthing wall 30, the main cylindrical portion 12 deforms into an outwardly expanding state. In this case, the reaction force of the marine fender 10 is given by the range II in the characteristic curve of FIG. 3, which exhibits a large resistance to the movement of the vessel.

Since the characteristic curve of the marine fender 10 shifts rightward owing to the presence of the closed head portion 18 as compared with that of the conventional marine fender provided with the shock receiving plate, even if the outside plate 40 well approaches to the berthing wall 30, the marine fender 10 can develop the effective buffering action.

Further, when the marine fender 10 periodically contacts with and separates from the outside plate 40 through wavy motion at the mooring state of the vessel after the berthing, the deformation of the closed head portion 18 is easy and the reaction force or thrusting force to the vessel is small, so that the jolting of the vessel is small.

Moreover, the arrangement of the closed head portion 18 does not need the attachment of the large weight shock receiving plate to the marine fender 10, so that the use of chains or the like conventionally used as a hanging means may be omitted to reduce the installation cost.

Figure 7:
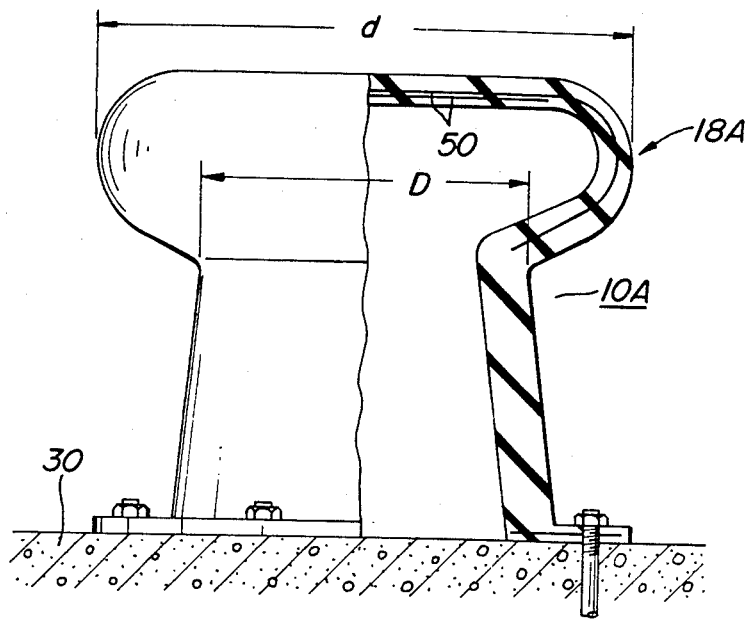
FIGS. 7 and 8 are side views partly shown in section of another embodiments of the marine fender according to the invention, respectively.
Figure 8:
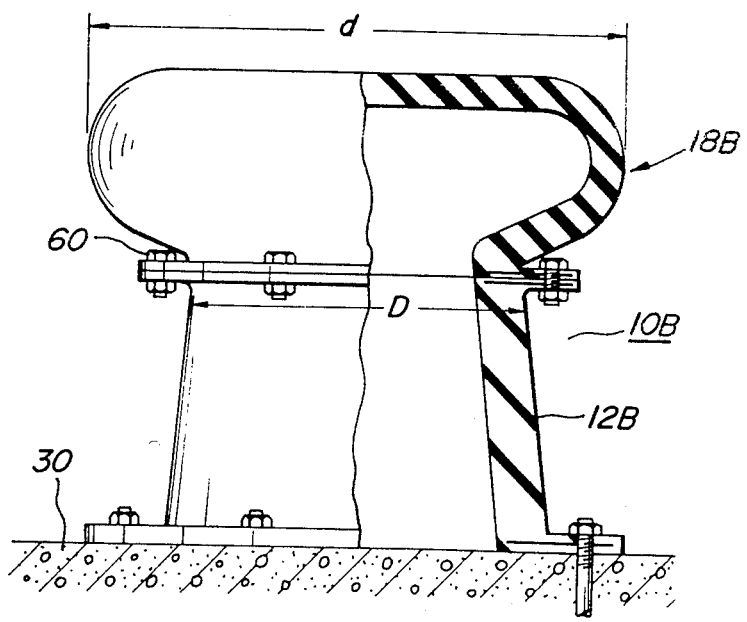

FIGS. 7 and 8 illustrate marine fenders 10A and 10B as another embodiment of the invention, respectively. In the marine fender 10A, a reinforcing member 50 such as canvs, hard rubber, resin, steel plate or the like is embedded in a closed head portion 18A (except that the steel plate is embedded only in the flat top part of the closed head portion). In the marine fender 10B, a main cylindrical portion 12B and a closed head portion 18B are formed separately and joined with each other through plural bolts 60 as one body.

As mentioned above, according to the invention, the marine fender made from the elastomeric material is constituted with the main cylindrical portion having the fitting flange in its base end, and the closed head portion formed by outwardly extending the front end of the main cylindrical portion, so that the use of the shock receiving plate can be omitted. Further, since the closed head portion easily deforms against the initial loading, the marine fender according to the invention can effectively cope with the inclination berthing, shearing berthing, change in the form of the outside plate for the vessel and the like. Moreover, when the main cylindrical portion is deformed under compression loading exceeding the deformation limit of the closed head portion, the sufficiently large reaction force is produced to develop a large absorption performance against the deformation energy.

What is claimed is:

1. A marine fender mounted to a berthing wall and made from an elastomeric material, comprising; a main cylindrical portion having a fitting flange on its base end, and a closed head portion formed by outwardly extending the front end of the main cylindrical portion, wherein rigidities of said main cylindrical portion and a contact part of said head portion are greater than that of a peripheral part of said head portion joining said main cylindrical portion and said marine fender satisfies the following relations:

$$\tfrac{1}{4} \leq h/H \leq 1,$$

and $$1 < d/D \leq 3,$$

wherein h is a height of the closed head portion, H is a height of the main cylindrical portion, d is an outer diameter of the closed head portion and D is an outer diameter of the small size part of the main cylindrical portion.

2. The marine fender according to claim 1, wherein said closed head portion is provided with a reinforcing member embedded there.

3. The marine fender according to claim 1, wherein said main cylindrical portion and said closed head portion are formed separately and joined with each other through bolts as one body.

* * * * *